United States Patent
Adkins et al.

(10) Patent No.: US 9,505,881 B1
(45) Date of Patent: Nov. 29, 2016

(54) POLYMER POLYOL COMPOSITIONS, A PROCESS FOR PREPARING THESE NOVEL POLYMER POLYOL COMPOSITIONS, FLEXIBLE FOAMS PREPARED FROM THESE NOVEL POLYMER POLYOLS AND A PROCESS FOR THE PREPARATION OF THESE FLEXIBLE FOAMS

(71) Applicant: Bayer MaterialScience LLC, Pittsburgh, PA (US)

(72) Inventors: Rick L. Adkins, Canonsburg, PA (US); Brian L. Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/735,552

(22) Filed: Jun. 10, 2015

(51) Int. Cl.
*C08F 283/06* (2006.01)
*C08G 65/34* (2006.01)
*C08J 9/12* (2006.01)
*C08J 9/00* (2006.01)
*C08G 65/32* (2006.01)

(52) U.S. Cl.
CPC .............. *C08G 65/34* (2013.01); *C08J 9/0042* (2013.01); *C08J 9/125* (2013.01); *C08J 2375/08* (2013.01)

(58) Field of Classification Search
CPC .............................. C08G 65/34; C08J 9/0042
USPC .................. 525/404; 528/176; 521/137, 146
See application file for complete search history.

(56) References Cited

U.S. PATENT DOCUMENTS

| | | | |
|---|---|---|---|
| 4,272,619 A | 6/1981 | Balle et al. | |
| 4,652,589 A | 3/1987 | Simroth et al. | |
| 5,196,476 A | 3/1993 | Simroth | |
| 5,688,861 A | 11/1997 | Simroth et al. | |
| 5,955,534 A | 9/1999 | Simroth et al. | |
| 6,143,802 A | 11/2000 | Simroth et al. | |
| 6,433,031 B1 | 8/2002 | Ramael | |
| 7,160,975 B2 | 1/2007 | Adkins et al. | |
| 8,835,565 B2 | 9/2014 | England et al. | |
| 2010/0036082 A1 | 2/2010 | Nakada et al. | |
| 2015/0274952 A1* | 10/2015 | Borella ................ C08G 18/632 521/137 |

FOREIGN PATENT DOCUMENTS

| | | |
|---|---|---|
| EP | 1624005 A1 | 2/2006 |
| EP | 1921113 A1 | 5/2008 |
| EP | 2194097 A1 | 6/2010 |
| EP | 2199309 A1 | 6/2010 |
| EP | 2202256 A1 | 6/2010 |
| EP | 2290002 A1 | 3/2011 |
| EP | 2679608 A1 | 1/2014 |
| WO | 2008005708 A1 | 1/2008 |
| WO | 2011155982 A2 | 12/2011 |
| WO | 2014137678 A1 | 9/2014 |

OTHER PUBLICATIONS

Rath, Aaron et al; "Effect of Average Particle Size and Distribution on the Performance of Copolymer Polyols"; Polyurethanes Expo 2002; Oct. 13-16, 2002.

* cited by examiner

Primary Examiner — Terressa Boykin
(74) Attorney, Agent, or Firm — N. Denise Brown

(57) ABSTRACT

This invention relates to novel polymer polyols, to a process for preparing these novel polymer polyols, to flexible polyurethane foams comprising these novel polymer polyols, and to a process for the production of these flexible polyurethane foams. These novel polymer polyols provide unexpected improvements in foams prepared therefrom.

18 Claims, No Drawings

POLYMER POLYOL COMPOSITIONS, A PROCESS FOR PREPARING THESE NOVEL POLYMER POLYOL COMPOSITIONS, FLEXIBLE FOAMS PREPARED FROM THESE NOVEL POLYMER POLYOLS AND A PROCESS FOR THE PREPARATION OF THESE FLEXIBLE FOAMS

BACKGROUND OF THE INVENTION

This invention relates to novel polymer polyol compositions, to a process of making these novel polymer polyol compositions, to polyurethane foams prepared from these polymer polyol compositions and to a process for the preparation of these polyurethane foams.

Polymer polyols are known to be useful in preparing polyurethane foams, including flexible foams. The general trend in foam properties of polyurethane foams which are prepared from a high solids content (i.e. at least 30% by weight solids) SAN polymer polyols is that the solids efficiency (i.e. the foam hardness per unit of SAN solids) decreases as the % by weight of solids in the polymer polyol increases.

It has been surprisingly found that the novel polymer polyols described herein can be used to prepare flexible polyurethane foams in which both foam load bearing (firmness) and foam set properties are improved compared to conventional polyurethane foams.

SUMMARY OF THE INVENTION

This invention relates to novel polymer polyol compositions. These novel polymer polyol compositions have a solids content of from 10 to 72% by weight, and comprise (A) a polymer polyol having a solids content of from 30 to 75% by weight, a viscosity at 25° C. of less than 50,000 mPa·s, and which comprises the reaction product of:
(1) at least one base polyol having a functionality of from 2 to 8 and a hydroxyl number of from 20 to 400;
(2) a mixture of ethylenically unsaturated monomers;
(3) a preformed stabilizer which comprises the reaction product of:
  (a) a macromer that contains reactive unsaturation and comprises the reaction product of:
    (i) a starter compound having a functionality of 2 to 8 and a hydroxyl number of from 20 to 50;
    (ii) 0.1 to 3% by weight, based on 100% by weight of the sum of components (i), (ii) and (iii), of a hydroxyl-reactive compound that contains reactive unsaturation;
    and
    (iii) 0 to 3% by weight, based on 100% by weight of the sum of components (i), (ii) and (iii), of a diisocyanate;
  with
  (b) one or more ethylenically unsaturated monomers; and
  (c) at least one free radical initiator;
  in the presence of
  (d) a polymer control agent;
  and, optionally,
  (e) a liquid diluent;
in the presence of
(4) at least one free radical initiator;
and, optionally,
(5) a chain transfer agent;
and
(B) at least one isocyanate-reactive component having a functionality of from 1 to 8 and a hydroxyl number of from 20 to 400;
wherein component (B) is present in an amount sufficient to reduce the total solids content in said polymer polyol (A) by at least 5% by weight.

The present invention also relates to a process for preparing the above novel polymer polyol compositions. This process comprises:
(I) blending:
  (A) a polymer polyol having a solids content of from 30 to 75% by weight, a viscosity at 25° C. of less than 50,000 mPa·s, and which comprises the free radical polymerization product of:
    (1) at least one base polyol having a functionality of from 2 to 8 and a hydroxyl number of from 20 to 400;
    (2) a mixture of ethylenically unsaturated monomers;
    (3) a preformed stabilizer which comprises the reaction product of:
      (a) a macromer that contains reactive unsaturation and comprises the reaction product of:
        (i) a starter compound having a functionality of 2 to 8 and a hydroxyl number of from 20 to 50;
        (ii) 0.1 to 3% by weight, based on 100% by weight of the sum of components (i), (ii) and (iii), of a hydroxyl-reactive compound that contains reactive unsaturation;
        and
        (iii) 0 to 3% by weight, based on 100% by weight of the sum of components (i), (ii) and (iii), of a diisocyanate;
      with
      (b) one or more ethylenically unsaturated monomers; and
      (c) at least one free radical initiator;
      in the presence of
      (d) a polymer control agent;
      and, optionally,
      (e) a liquid diluent;
    in the presence of
    (4) at least one free radical initiator;
    and, optionally,
    (5) a chain transfer agent;
and
  (B) at least one isocyanate-reactive component having a functionality of from 1 to 8 and a hydroxyl number of from 20 to 400;
wherein component (B) is present in an amount sufficient to reduce the total solids content in said polymer polyol (A) by at least 5% by weight.

This invention also relates to a flexible polyurethane foam comprising the reaction product of:
(I) one or more diisocyanates, polyisocyanates or mixtures thereof;
with
(II) an isocyanate-reactive component that comprises the novel polymer polyol compositions described herein;
(III) one or more catalysts;
(IV) one or more blowing agents;
and, optionally,
(V) one or more surfactants.

The present invention also relates to a process for preparing a flexible polyurethane foam by reacting:
(I) one or more diisocyanates, polyisocyanates or mixtures thereof;
with
(II) an isocyanate-reactive component comprising the polymer polyol composition of claim 1;
in the presence of
(III) one or more catalysts;
(IV) one or more blowing agents;

(V) and, optionally,
(VI) one or more surfactants.

In another embodiment of the invention, the novel polymer polyol compositions. These novel polymer polyol compositions have a solids content of from 10 to 72% by weight, and comprise
(A) a polymer polyol having a solids content of from 44 to 75% by weight, a viscosity at 25° C. of less than 50,000 mPa·s, and which comprises the reaction product of:
  (1) at least one base polyol having a functionality of from 2 to 8 and a hydroxyl number of from 20 to 400;
  (2) a mixture of ethylenically unsaturated monomers;
  (3) a preformed stabilizer which comprises the reaction product of:
    (a) a macromer that contains reactive unsaturation and comprises the reaction product of:
      (i) a starter compound having a functionality of 2 to 8 and a hydroxyl number of from 20 to 50;
      (ii) 0.1 to 3% by weight, based on 100% by weight of the sum of components (i), (ii) and (iii), of a hydroxyl-reactive compound that contains reactive unsaturation;
      and
      (iii) 0 to 3% by weight, based on 100% by weight of the sum of components (i), (ii) and (iii), of a diisocyanate;
    with
    (b) one or more ethylenically unsaturated monomers;
    and
    (c) at least one free radical initiator;
    in the presence of
    (d) a polymer control agent;
    and, optionally,
    (e) a liquid diluent;
  in the presence of
  (4) at least one free radical initiator;
  and, optionally,
  (5) a chain transfer agent;
and
(B) at least one isocyanate-reactive component having a functionality of from 1 to 8 and a hydroxyl number of from 20 to 400;
wherein component (B) is present in an amount sufficient to reduce the total solids content in said polymer polyol (A) by at least 5% by weight.

DETAILED DESCRIPTION OF THE INVENTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. §112 and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. §112 and 35 U.S.C. §132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the following terms shall have the following meanings.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

The term "solids efficiency" as used herein refers to the ratio of a selected % IFD value for a foam relative to the polymer solids content in the polyol portion of the foam formulation (i.e. $PS_{FOAM}$) which was used to prepare the foam, while maintaining other foam variables such as Isocyanate Index, pad weight/density, pack lever/water content, etc. constant. The IFD (Indentation Force Deflection) which is a known and accepted means of quantifying foam firmness is measured in accordance with ASTM D3574. The 25% IFD, the 50% IFD and the 65% IFD values of foams are traditionally measured to characterize the firmness of foams at these percent deflections.

As used herein, "solids" efficiency in a polymer polyol is calculated as follows:

The weight percent polymer solids content of a direct made polymer polyol is expressed as $PS_{PMPO}$, and the blended down polymer solids content in the polyol portion of the foam formulation is expressed as $PS_{FOAM}$. The following relationship exists for one hundred parts of polyol in the foam formulation:

$$PS_{FOAM} = pphp\ Polymer\ Polyol * PS_{PMPO}$$

Thus, if (for example) the weight percent polymer solids content of a polymer polyol (i.e. $PS_{PMPO}$) equals 50%, and the pphp Polymer Polyol in the foam formulation equals 50 pphp, the polymer solids content of the resultant foam formulation (i.e. $PS_{FOAM}$) is calculated by solving the equation below:

$$PS_{FOAM} = 50\ pphp(Polymer\ Polyol) \times 50\%$$
$$(PS_{PMPO}) = 25\%\ solids$$

Once the blended down polymer solids content in the polyol portion of the foam formulation ($PS_{FOAM}$) is determined, the solids efficiency of the polymer polyol can be determined by calculating the ratio of a selected % IFD value of a foam to the $PS_{FOAM}$ value.

$$Solids\ Efficiency(at\ X\%\ IFD) = Measured\ IFD(at\ X\%\ IFD)/PS_{FOAM}$$

As used in the above equation, X % IFD represents the 25% IFD, the 50% IFD or the 65% IFD.

As previously stated, the % IFD value is calculated using the test protocol in ASTM D3574, while other foam variables such as, for example, isocyanate index, density and/or pad weight, pack level/water content, etc. are kept constant.

As used herein "viscosity" is in millipascal-seconds (mPa·s) measured at 25° C. on an Anton Paar SVM3000 viscometer.

In accordance with the present invention, it is understood that the total solids reduction of the polymer polyol (A) is at least 5% by weight. It can, however, be greater than 5% by weight. For example, it is possible to have a 50% reduction in the solids content of a 30% by weight solids containing polymer polyol; or to have an 85% reduction in the solids content of a 75% by weight solids containing polymer polyol. These two examples would result in the novel polymer polyol compositions herein having a solids content of 15% by weight; or about 11% by weight, respectively. The maximum percent of total solids reduction of the polymer polyol (A) is such that the total solids content of the novel polymer polyol compositions herein does not go below 10% total solids The polymer polyols (A) of the present invention are characterized by a solids content of 30 to 75% by weight, and a viscosity at 25° C. of less than 50,000 mPa·s.

These polymer polyols (A) may have a minimum solids content of 30%, of 35%, of 40%, or of 44%, or of 45% by weight. They may also have a maximum solids content of 75%, of 70%, of 60%, or of 55%. The polyols polyols (A) of the invention may have a solids content ranging between any combination of these upper and lower values, inclusive, e.g. from about 30% to about 75%, from about 35% to about 70%, from about 40% to about 60% or from about 45% to about 55% by weight.

In one embodiment, the polymer polyols (A) are characterized by a solids content of from 44% to 75% by weight, or from 45% to 75% by weight, of from 45% to 65 by weight.

Polymer polyols (A) of the invention are typically characterized by a viscosity (at 25° C.) of less than 50,000 mPa·s. These polymer polyols may also have a viscosity (at 25° C.) of less than 40,000, of less than 30,000, of less than 20,000 or of less than 10,000 mPa·s.

Suitable polyols to be used as (A)(1) the base polyols in the present invention include, for example, polyether polyols. Suitable polyether polyols include those having a functionality of at least about 2, or of at least about 3. The functionality of suitable polyether polyols is less than or equal to about 8, or less than or equal to about 6. The suitable polyether polyols may also have functionalities ranging between any combination of these upper and lower values, inclusive, such as from about 2 to about 8, or of from about 2 to about 6, or of from about 3 to about 6. The OH numbers of suitable polyether polyols is at least about 20, or at least about 25, or at least about 30. Suitable polyether polyols typically also have OH numbers of less than or equal to about 400, or less than or equal to about 200, or less than or equal to about 150. The suitable polyether polyols may also have OH numbers ranging between any combination of these upper and lower values, inclusive, such as, for example, from at least about 20 to less than or equal to about 400, or from at least about 25 to less than or equal to about 200, or from at least about 30 to less than or equal to about 150.

The suitable polyether polyols for component (A)(1) may have functionalities ranging from about 2 to about 8, or from about 3 to about 6.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH=(56.1\times1000\times f)/\text{mol. wt.}$$

wherein:
OH: represents the hydroxyl number of the polyol,
f: represents the functionality of the polyol, i.e. the average number of hydroxyl groups per molecule of polyol,
and
mol. wt. represents the molecular weight of the polyol.

Examples of such compounds for component (A)(1) include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylol-propane, glycerol, pentaerythritol, sorbitol, sucrose, ethylenediamine, toluene diamine, etc. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis(hydroxyphenol)ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

It should also be appreciated that blends or mixtures of various useful polyols may be used if desired.

Suitable compounds to be used as the ethylenically unsaturated monomers, i.e. component (A)(2) the present invention include, for example, those ethylenically unsaturated monomers described above with respect to the pre-formed stabilizer. Suitable monomers include, for example, aliphatic conjugated dienes such as butadiene and isoprene; monovinylidene aromatic monomers such as styrene, a-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)-acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred that styrene and acrylonitrile are used in sufficient amounts such that the weight ratio of styrene to acrylonitrile (S:AN) is from about 80:20 to 20:80, more preferably from about 75:25 to 25:75. These ratios are suitable for polymer polyols and the processes of preparing them, regardless of whether they comprise the ethylenically unsaturated macromers or the pre-formed stabilizers of the present invention.

Overall, the polymer solids content that is present in (A) the polymer polyols herein is at least about 30% by weight, and less than or equal to about 75% by weight. These polymer polyols may have solids contents of at least 30% by weight, or of at least 35% by weight, or of at least 40% by weight, based on 100% by weight of the polymer polyol. The solids contents present in the polymer polyols is typically about 75% by weight or less, or about 70% by weight or less, or about 55% by weight or less, based on 100% by weight of the polymer polyol. The polymer polyols of the present invention typically has a solids content ranging between any combination of these upper and lower values, inclusive, e.g. from 30% to 75% by weight, or of from 35% to 70% by weight, or of from 40% to 55% by weight, based on the total weight of the polymer polyol.

Suitable preformed stabilizers to be used as component (A)(3) in the present invention are preformed stabilizers which comprise the reaction product of:
(a) a macromer that contains reactive unsaturation;
with
(b) one or more ethylenically unsaturated monomers;
and
(c) at least one free radical initiator;
in the presence of
(d) at least one polymer control agent;
and, optionally,
(e) a chain transfer agent.

Suitable macromers herein contain reactive unsaturation. These macromers comprise the reaction product of: (i) a starter compound having a functionality of 2 to 8, and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 3% by weight, based on 100% by weight of the sum of components (i), (ii) and (iii), of a diisocyanate.

As described in, for example, U.S. Pat. No. 5,196,476, the disclosure of which is herein incorporated by reference, suitable preformed stabilizers can be prepared by reacting a combination of components (a), (b), (c) and (d), and optionally, (e), as described above, in a reaction zone maintained at a temperature sufficient to initiate a free radical reaction, and under sufficient pressure to maintain only liquid phases in the reaction zone, for a sufficient period of time to react (a), (b) and (c); and recovering a mixture containing the preformed stabilizer dispersed in the polymer control agent.

Suitable starter compounds to be used as (i) in the macromer containing reactive unsaturation, include compounds having a hydroxyl functionality of from 2 to 8, or of from 3 to 6; and have a hydroxyl number of from 20 to 50 or of from 25 to 40. Examples of such starter compounds include alkylene oxide adducts of hydroxyl functional compounds such as ethylene glycol, propylene glycol, diethylene glycol, dipropylene glycol, tripropylene glycol, glycerin, trimethylolpropane, pentaerythritol, sorbitol, ethylenediamine, toluene diamine, etc. These alkylene oxide adducts may comprise propylene oxide, ethylene oxide, butylene oxide, styrene oxide, and mixtures thereof. It is possible for these starter compounds comprise 100% of an alkylene oxide such as, for example, propylene oxide, or a mixture of propylene oxide and a second alkylene oxide such as ethylene oxide or butylene oxide. When a mixture of alkylene oxides are used to form the starter compounds (i), mixtures of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possibly to use a combination of simultaneous and sequential addition of alkylene oxides. In one embodiment, an alkylene oxide such as propylene oxide may be added first, and then a second alkylene oxide such as ethylene oxide added as a cap.

Other examples of such compounds for starter (i) in the macromer include polyoxyethylene glycols, triols, tetrols and higher functionality polyols, and mixtures thereof, etc.

When mixtures are used, the ethylene oxide and propylene oxide may be added simultaneously or sequentially to provide internal blocks, terminal blocks or random distribution of the oxyethylene groups and/or oxypropylene groups in the polyether polyol.

By alkoxylation of the starter, a suitable compound for the starter of the macromer can be formed. The alkoxylation reaction may be catalyzed using any conventional catalyst including, for example, potassium hydroxide (KOH) or a double metal cyanide (DMC) catalyst.

Other suitable polyols for the starter (i) of the macromer in the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

In one embodiment, the starter compound has a functionality of from 3 to 6 and a hydroxyl number of from 25 to 40, and is prepared by reacting a starter such as glycerin, trimethylolpropane, pentaerythritol, dipentaerythritol, sorbitol, mannitol, etc., with alkylene oxides comprising at least one alkylene oxide such as, for example, propylene oxide and/or ethylene oxide.

In another embodiment, the ethylene oxide comprises from 1 to 40% by weight, or from 5 to 30%, or from 10 to 25% by weight, based on the total weight of the starter compound.

In an alternate embodiment, all or a portion of the ethylene oxide is added as a cap on the end of the starter compound. Suitable amounts of ethylene oxide to be added as a cap range from 1 to 40, or 3 to 30 or 5 to 25 (based on 100% by weight of the starter compound).

Suitable compounds to be used as component (3)(a)(ii) the hydroxyl-reactive compound that contains reactive unsaturation include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

The macromer (a) may additionally comprise (iii) 0 to 3% by weight, or from 0.05 to 2.5% by weight, or 0.1 to 1.5% by weight, based on 100% by weight of the sum of components (i), (ii) and (iii), of a diisocyanate component. Suitable diisocyanates include various isomers of diphenylmethane diisocyanate and isomeric mixtures of diphenylmethane diisocyanate such as, for example a mixture of 2,4'-diphenylmethane diisocyanate, 4,4'-diphenylmethane diisocyanate and/or 2,2'-diphenyl-methane diisocyanate. In one embodiment, a mixture of 2,4'-diphenylmethane diisocyanate and of 4,4'-diphenylmethane diisocyanate is suitable. Other suitable isocyanates include toluenediisocyanate, isophoronediisocyanate, hexamethylenediisocyanate, 4,4'-methylenebis(cyclohexyl isocyanate), etc.

Suitable compounds to be used as component (b) above, the ethylenically unsaturated monomers include, for example, compounds which contain ethylenic unsaturation. Of particular relevance are those compounds that are free radically polymerizable. Some examples of suitable compounds include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-dimethylaminomethyl)acryl-amide and the like; vinyl esters such as vinyl acetate; vinyl ethers, vinyl ketones, vinyl and vinylidene halides as well as a wide variety of other ethylenically unsaturated materials which are copolymerizable with the aforementioned macomer. It is understood that mixtures of two or more of the aforementioned ethylenically unsaturated monomers are also suitable to be employed in making the pre-formed stabilizer. Of the above monomers, the monovinylidene aromatic monomers such as styrene, and the ethylenically unsaturated nitriles, such as acrylonitrile may be particularly suitable.

It is preferred that (b) comprises a mixture of acrylonitrile and at least one other ethylenically unsaturated comonomer which is copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like. Mixtures of styrene and acrylonitrile may be used.

When using acrylonitrile with a comonomer, it is recommended that a minimum of about 5 to 15 percent by weight acrylonitrile be maintained in the system. Styrene will generally be used as the comonomer, but methyl methacrylate or other monomers may be employed in place of part or all of the styrene. A specific monomer mixture for component (b) in making the preformed stabilizer composition (3) comprises mixtures of acrylonitrile and styrene. The weight proportion of acrylonitrile can range from about 20 to 80 weight percent of the comonomer mixture, or from about 30 to about 70 weight percent, and styrene can accordingly vary from about 80 to about 20 weight percent, or from about 70 to about 30 weight percent of the mixture. An acrylonitrile to styrene ratio in the monomer mixture of from about 20:80 to 80:20 can be used. A mixture of acrylonitrile to styrene having a weight ratio of from about 30:70 to about 70:30 can also be used.

The free radical polymerization initiators suitable for use as component (c) in the suitable preformed stabilizers (3) of the present invention encompass any free radical catalyst suitable for grafting of an ethylenically unsaturated polymer to a polyether containing compound, such as polyether polyol. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful catalysts also include, for example, those catalysts having a satisfactory half-life within the temperature ranges used to form the preformed stabilizer, i.e. the half-life should be about 25 percent or less of the residence time in the reactor at a given temperature. Representative examples of useful catalyst species include t-butyl peroxy-2-ethylhexanoate, t-butylperpivalate, t-amyl peroctoate, 2,5-dimethyl-hexane-2,5-di-per-2-ethyl hexoate, t-butylperneodecanoate, and t-butylperbenzoate. Useful also are the azo catalysts such as azobis-isobutyronitrile, 2,2'-azo bis-(2-methylbutyro-nitrile), and mixtures thereof. The preferred free radical catalysts are peroxides such as tertiary butyl peroctoate.

Suitable catalysts concentrations range from about 0.01 to about 2% by weight, preferably from about 0.05 to 1% by weight, and most preferably 0.05 to 0.3% by weight, based on the total weight of the components (i.e. 100% by weight of the combined weight of the macromer, the ethylenically unsaturated monomer, the free-radical polymerization initiator and, the polymer control agent, and optionally, the liquid diluent). Up to a certain point, increases in the catalyst concentration result in increased monomer conversion and grafting; but further increases do not substantially increase conversion. Catalyst concentrations which are too high can cause cross-linking in the preformed stabilizer (3). The particular catalyst concentration selected will usually be an optimum value considering all factors, including costs.

In accordance with the present invention, components (a), (b), and (c) of the pre-formed stabilizer are soluble in (d) the polymer control agent. However, the resultant preformed stabilizer (3) is essentially insoluble in (d) the polymer control agent. This component may be one polymer control agent or a mixture of polymer control agents. Suitable compounds to be used as polymer control agents in accordance with the present invention include various mono-ols (i.e. monohydroxy alcohols), aromatic hydrocarbons, ethers, and other liquids, such as those described in, for example, U.S. Pat. Nos. 3,953,393, 4,119,586, 4,463,107, 5,324,774, 5,814,699 and 6,624,209, the disclosures of which are herein incorporated by reference. As long as the compound used as the polymer control agent does not adversely affect the performance of the preformed stabilizer (3), it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. However, it should not form two phases under the reaction conditions and it should be readily stripped from the final polymer/polyol.

The selection of mono-ol is typically an alcohol containing at least one carbon atom, such as methanol, ethanol, n-propanol, isopropanol, n-butanol, sec.-butanol, t-butanol, n-pentanol, 2-pentanol, 3-pentanol, and the like, and mixtures of the same. In one embodiment, the polymer control agent is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents (d) can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of preformed stabilizer (3)). The amount of crude polymer control agent in the total polymer control agent can range anywhere from 0% up to 100% by weight.

The polyol components suitable as component (e) the diluent in the present invention include typically the alkylene oxide adduct of A(OH)>3 described above. Though the polyol used as component (5) can encompass the variety of polyols described above, including the broader class of polyols described in U.S. Pat. No. 4,242,249, at column 7, line 39 through column 9, line 10, the disclosure of which is herein incorporated by reference. It is preferred that the polyol component (5) be the same as or equivalent to the polyol used in the formation of precursor used to prepare the preformed stabilizer (PFS). Typically, the polyol need not be stripped off.

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

In general, the amount of the components in the formulation, on a weight percent of the total formulation for forming preformed stabilizer (3), is as follows:

| Component of Formulation | Amount, weight % |
| --- | --- |
| (a) | about 10 to 40, preferably 15 to 35, |
| (b) | about 10 to 30, preferably 15 to 25, |
| (c) | about 0.01 to 2, preferably 0.1 to 1, |
| (d) | about 30 to 80, preferably 40 to 70, |
| (e) | about 0 to 40, preferably 0 to 20, or more preferably 0 to 10. |

In the formulations proposed above for the preformed stabilizer (3), the %'s by weight of components (a), (b), (c) and (d), and optionally (e), totals 100% by weight of component (3), the preformed stabilizer.

The process for producing the preformed stabilizer (3) is similar to the process for making the polymer polyol. The temperature range is not critical and may vary from about 80° C. to about 150° C. or perhaps greater. Another suitable range is from 115° C. to 125° C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g.—a stirred flask or stirred autoclave). The reactors of this type keep the reaction mixture relatively homogeneous and so prevent localized high monomer to macromer ratios such as occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

Suitable free-radical initiators to be used as component (4) in the present invention include, for example, those as described previously for the formation of the preformed stabilizers. Examples of suitable free-radical polymerization initiators for the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those catalysts having a satisfactory half-life within the temperature ranges used in forming the polymer polyol. Typically, the half-life of the catalyst should be about 25% or less of the residence time in the reactor at any given time. Preferred initiators for this portion of the invention include acyl peroxides such as didecanoyl peroxide and dilauroyl peroxide, peroxyesters such as t-butyl peroxy-2-ethylhexanoate, t-butylperpivalate, t-amyl peroxy pivalate, t-amyl peroctoate, 2,5-dimethylhexane-2,5-di-per-2-ethyl hexoate, t-butyl perneodecanoate, t-butylper-benzoate and 1,1-dimethyl-3-hydroxybutyl peroxy-2-ethylhexanoate, and azo catalysts such as azobis (isobutyronitrile), 2,2'-azo bis-(2-methoxyl-butyronitrile), and mixtures thereof. Most preferred are the peroxyesters described above and the azo catalysts. A particularly preferred initiator comprises azobis(isobutyronitrile).

Particularly preferred in the practice of the invention, are the use of azo catalysts and the aforementioned peroxyesters of the above formula. The preferred peroxyesters include those which have the unique advantage of affecting the desired degree of polymerization essentially without raising the viscosity of the polymer polyol over that obtained with the azo catalyst. This enhances one's ability to achieve higher solids polymer polyols with good product stability without raising product viscosity. Such peroxyesters can be used in molar amounts substantially less than the amounts required when using other free radical catalysts in forming the polymer polyols.

The quantity of free-radical initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

In addition, the polymer polyol and the process of preparing the polymer polyol may optionally comprise (5) a chain transfer agent. The use of chain transfer agents and their nature is known in the art. Examples of suitable materials include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all in the present invention, a chain transfer agent is preferably used in an amount of from about 0.1 to about 2 wt. %, more preferably from about 0.2 to about 1 wt. %, based on the total weight of the polymer polyol (prior to stripping).

The polymer polyols from the present invention can be made using any process (including continuous and semi-batch) and reactor configuration that is known to be suitable to prepare polymer polyols, such as, for example, a two-stage reaction system comprising a continuously-stirred tank reactor (CSTR) fitted with impeller(s) and baffles (first-stage) and a plug-flow reactor (second stage). A typical reaction system may be equipped with any combination of jacket/half-coil, internal coil/tubes or external loop/cooler to remove the heat of reaction. Furthermore, the reaction system can utilize a wide range of mixing conditions. The reaction system may be characterized by energy inputs of from 0.5 to 350 horsepower per 1000 gallons, with preferred mixing energies of from 2 to 50 horsepower per 1000 gallons on average for the bulk phase volume of each reactor as a particularly useful mixing power input. Mixing can be provided by any combination of impeller(s) and pump-around loop/jet mixing. It will be appreciated by one of ordinary skill in the art that the optimum energy input will most likely vary with the dispersion stability and the molecular weight of the base polyether polyol, e.g., a greater amount of energy is preferred for products with higher viscosities. In addition, polymer polyols of the present invention can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, Maxflow, propeller, etc. For a continuous production process to prepare polymer polyols including those described in the present invention, a residence time ranging from about 20 to about 180 minutes for the first reactor may be particularly useful. It is understood that for a multistage reactor system, total residence time is additive based on number of reactors.

The reactants are pumped from feed tanks through an in-line static mixer, and then, through a feed tube into the reactor. It may be particularly useful to prepare a premix of the initiator with part of the polyol stream, as well as of polyol and stabilizer. In general, feed stream temperatures are ambient (i.e. 25° C.). However, if desired, feed streams can be heated to ≥25° C. prior to mixing and entering the reactor. Other process conditions, which may be useful, include cooling of the feed tube in the reactor. Furthermore, the suitable reaction conditions for polymer polyols in general as well as the specific products of the present invention mixture are characterized by a reaction temperature in the range of 80 to 200° C. and a pressure in the range of 20 to 80 psig. Typically, the product can then treated in a single or multi staged stripping step to remove volatiles before entering a stage, which can essentially be any combination of filtration and/or product cooling. In the present case, the wt.-% total polymer in the product was calculated from the concentrations of monomers measured in the crude polymer polyol before stripping.

In accordance with the present invention, the polymer polyols are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 80° C. to about 200° C. or perhaps greater, preferably from about 100° C. to about 140° C., with a more preferred range being from 115° C. to 125° C. As has been noted herein, the catalyst and temperature should be selected such that the catalyst has a reasonable rate of decomposition with respect to the hold-up time in the reactor for a continuous flow reactor or the feed time for a semi-batch reactor.

A suitable continuous process for making polymer polyols comprises (1) providing a heterogenous mixture of the preformed stabilizer and, optionally, liquid diluent, in combination with a polyol, a free radically polymerizable ethylenically unsaturated monomer, and a free radical polymerization initiator, (2) in a reaction zone maintained at a temperature sufficient to initiate a free radical reaction, and under sufficient pressure to maintain only liquid phases in the reaction zone, for a period of time sufficient to react at least a major portion of the ethylenically unsaturated monomer to form a heterogenous mixture containing the enhanced polymer polyol, unreacted monomers and diluent, and stripping the unreacted monomers and diluent from the enhanced polymer polyol to recover the unreacted monomers and diluent. This continuous process allows the manufacture of high solids, white polymer polyols with lower viscosities and good stability. This product has excellent product stability and requires less free radical catalyst in the production process. Other pertinent details for the continuous process of preparing polymer polyols can be found in, for example, U.S. Pat. No. 5,196,476, the disclosure of which is herein incorporated by reference.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present invention comprise dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

Following polymerization, volatile constituents, in particular those from the PCA and residues of monomers are generally stripped from the product by the usual method of vacuum distillation, optionally in a thin layer of a falling film evaporator. The monomer-free product may be used as is, or may be filtered to remove any large particles that may have been created.

In one embodiment, all of the product (viz. 100%) will pass through the filter employed in the 150 mesh filtration hindrance (i.e. filterability) test that will be described in conjunction with the Examples. This ensures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles.

In accordance with the present invention, polymer polyol (A) and at least one isocyanate-reactive component (B) are combined to form the novel polymer polyol compositions having a solids content of from 10 to 72% by weight, with component (B) present in an amount sufficient to reduce the total solids content in the polymer polyol (A) by at least 5% by weight.

Suitable compounds to be used as isocyanate-reactive component (B) include those which have a hydroxyl functionality of from 1 to 8 and a hydroxyl number of from 20 to 400. These compounds may also have a functionality of at least about 2, or at least about 3. In addition, the suitable compounds may have a hydroxyl functionality of about 7 or less, or of about 6 or less. Suitable compounds may also be characterized by a hydroxyl number of at least 20, or of at least 25 or of at least 30. These may also have a hydroxyl number of about 400 or less, or of about 200 or less; or of about 150 or less.

Examples of suitable compounds to be used as the isocyanate-reactive component (B) include polyether polyols, polyester polyols, polyether carbonate polyols, etc. Also suitable are relatively low molecular weight compounds based on a functionality of 1 and an OH # of 400 (MW=140). Other suitable compounds include, for example, polyoxyalkylene polyols, polyester polyols, polythioethers, polyacetals, polycarbonates, polyethercarbonate polyols, etc. Lower molecular weight isocyanate-reactive components such as crosslinkers and/or chain extenders may also be present.

In accordance with the present invention, flexible polyurethane foams may be prepared from the novel polymer polyols described herein. These foams comprise the reaction product of a polyisocyanate component, with an isocyanate-reactive component that comprises the novel polymer polyols described herein, in the presence of one or more catalysts, one or more blowing agents, and optionally, one or more surfactants. In addition, the isocyanate-reactive component may additionally comprise one or more crosslinking agents, one or more chain extenders, and/or one or more polyether polyols containing a high ethylene oxide content. It is also possible that the isocyanate-reactive component additionally comprises one or more polyoxyalkylene polyols, polyether polyols, polyester polyols, polycarbonate ether polyols, polythioethers, polycarbonates, polyacetals, etc., and mixtures thereof. Various additives and/or auxiliary agents which are known to be useful in preparing foams may also be present.

The flexible polyurethane foams of present invention which comprise the reaction product of the novel polymer polyols described herein have been found to exhibit improved solids efficiency.

The process of preparing the flexible polyurethane foams comprises reacting (I) a polyisocyanate component, with (II) an isocyanate-reactive component comprising the novel polymer polyols described herein, in the presence of (III) one or more catalysts, (IV) one or more blowing agents and, optionally, (V) one or more surfactants. In addition, crosslinking agents, chain extenders, other isocyanate-reactive components, etc., as described herein above, as well as various other additives and auxiliary agents may also be present.

Suitable polyisocyanates for the polyisocyanate component (I) comprise those known in the art, to be suitable for the preparation of flexible polyurethane foams. The polyisocyanates may be di- or poly-functional, and include, for example, (cyclo)aliphatic di- and/or polyisocyanates, aromatic di- and/or polyisocyanates, and araliphatic di- and/or polyisocyanates. Some specific examples of suitable aromatic polyisocyanates and aromatic diisocyanates include compounds such as toluene diisocyanate, diphenylmethane diisocyanate, polymethylene polyphenyl polyisocyanate, etc., and mixtures or blends thereof.

Suitable blends of polyisocyanates for component (I) include, for example, blends comprising (1) from 10 to 90 wt. % of one or more isomer of toluene diisocyanate and (2) from 90 to 10 wt. % of polymethylene polyphenylisocyanate and/or one or more isomers of diphenylmethane diisocyanate, with the sum of the wt. %'s totaling 100 wt. % of the polyisocyanate component; blends comprising (1) 70 to 90 wt. % of one or more isomers of diphenylmethane diisocyanate, and (2) 10 to 30 wt. % of one or more isomers of toluene diisocyanate, with the sum of the wt. %'s totaling 100 wt. % of the polyisocyanate component; and blends comprising (1) 70 to 90 wt. % of one or more isomers of toluene diisocyanate, and (2) 30 to 10 wt. % of polymethylene polyphenylisocyanate, with the sum of the wt. %;s totaling 100 wt. % of the polyisocyanate component.

Suitable compounds to be used as component (II), the isocyanate-reactive component, herein for the preparation of flexible polyurethane foams include the novel polymer polyols described herein. In accordance with the present invention, the isocyanate-reactive component (II) may additionally comprise a conventional (i.e. non-solids containing) isocyanate-reactive component such as, for example, a polyoxyalkylene polyol, a polyether polyol, a polyester polyol, a polythioether, a polyacetal, a polycarbonate, a polycarbonate ether polyol, etc., and mixtures thereof. These isocyanate-reactive compounds having a functionality of from 2 to 8, or from 2 to 6, or from 2 to 4, and a molecular weight of from 1000 to 12,000, or from 1000 to 8,000, or from 2000 to 6000. In addition, lower molecular weight isocyanate-reactive components such as crosslinkers and/or chain extenders may be used. These lower molecular weight isocyanate-reactive components include chain extenders which may have functionalities of 2 and molecular weights ranging from 61 to 500; and cross linking agents which may have functionalities of 3 to 4 and molecular weights ranging from 92 to less than 1000, or from 92 to less than or equal to 750. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc., and mixtures thereof, and alkylene oxide adducts thereof. Some examples of suitable crosslinking agents include glycerol, trimethylolpropane, pentaerythritol, diethanolamine, triethanolamine, etc., mixtures thereof, and alkylene oxide adducts thereof. It is also possible to use a polyether polyol that contains a high ethylene oxide content.

At least one polyurethane catalyst is required to catalyze the reactions of the monol, polyols and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like. Preferred catalysts are amine catalysts such as, for example, bis(dimethylaminoethyl)ether in dipropylene glycol and triethylene diamine in dipropylene glycol. These are commercially available as Niax A-1 and Niax A-33, respectively.

The polyurethane catalysts are typically used in an amount within the range of about 0.05 to about 3 parts, more preferably from about 0.1 to about 2 parts, per 100 parts of isocyanate-reactive mixture.

Suitable (III) blowing agents for the present invention include, for example chemical blowing agents and/or physical blowing agents. Some examples of the suitable blowing agents for the present invention include water, formic acid, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal, etc. It is possible to use a mixture of blowing agent in the present invention. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein, In addition, water may be used as the sole blowing agent.

The amount of blowing agent or blowing agent mixture used is from 0.5 to 20%, preferably from 0.75 to 10% by weight, based in each case on the total weight of the component (B). When water is the blowing agent, it is typically present in an amount of from 0.5 to 10%, and preferably from 0.75 to 7% by weight, based on the total weight of the component (B). The addition of water can be effected in combination with the use of the other blowing agents described.

Surfactants are preferably used to prepare the foams. Surfactants are known help to stabilize the foam until it cures. Suitable surfactants for the invention are those well known in the polyurethane industry. A wide variety of organosilicone surfactants are commercially available. Examples of suitable surfactants include DC-5043, DC-5164 and DC-5169, as well as Niax L-620, a product of Momentive Performance Materials, and Tegostab B8244, a product of Evonik-Goldschmidt. Many other silicone surfactants known to those in the art may be substituted for these suitable silicones. The surfactant is typically used in an amount within the range of about 0.1 to 4, preferably from about 0.2 to 3, parts per 100 parts of isocyanate-reactive mixture.

Other optional components that may be present in the flexible foam formulations include, for example, flame retardants, antioxidants, pigments, dyes, liquid and solid fillers, etc. Such commercial additives are included in the foams in conventional amounts when used.

The flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with the present invention, the flexible foams are prepared at isocyanate indices ranges from 70 to 130, or from 80 to 120 or from 90 to 110. The term "isocyanate index", which may also be referred to as the NCO index, is defined herein as the ratio of reactive isocyanate groups (equivalents) to active hydrogen groups (equivalents), multiplied by 100%.

Although less preferred, a prepolymer approach to making the foams can also be used. In this approach, a significant portion of the isocyanate-reactive mixture is reacted with the polyisocyanate, and the resulting prepolymer is then reacted with the remaining components.

Certain embodiments of the present invention, therefore, are directed to a polymer polyol composition having a solids content of from 10 to 72% by weight, and comprising (A) a polymer polyol having a solids content of from 30 to 75% by weight, a viscosity at 25° C. of less than 50,000 mPa·s, and which comprises the reaction product of: (1) at least one base polyol having a functionality of from 2 to 8 and a hydroxyl number of from 20 to 400; (2) one or more ethylenically unsaturated monomers; (3) a preformed stabilizer which comprises the reaction product of: (a) a macromer that contains reactive unsaturation and comprises the reaction product of: (i) a starter compound having a functionality of 2 to 8 and a hydroxyl number of from 20 to 50; (ii) 0.1 to 3% by weight, based on 100% by weight of the sum of components (i), (ii) and (iii), of a hydroxyl-reactive compound that contains reactive unsaturation; and (iii) 0 to 3% by weight, based on 100% by weight of the sum of components (i), (ii) and (iii), of one or more diisocyanates; with (b) one or more ethylenically unsaturated monomers; and (c) at least one free radical initiator; in the presence of (d) a polymer control agent; and, optionally, (e) a liquid diluent; in the presence of (2) at least one free radical initiator; and, optionally, (3) a chain transfer agent; and (B) at least one polyol component having a functionality of from 1 to 8 and a hydroxyl number of from 20 to 400; wherein component (B) is present in an amount sufficient to reduce the total solids content in said polymer polyol (A) by at least 5% by weight.

Certain embodiments of the present invention are directed to the polymer polyol compositions of the previous paragraph, wherein (A)(3)(a) the macromer comprises the reaction product of (i) a starter compound having a functionality of 3 to 6 and a hydroxyl number of from 25 to 40; (ii) 0.1 to 3% by weight, based on 100% by weight of the sum of components (i), (ii) and (iii), of a hydroxyl-reactive compound that contains reactive unsaturation that is selected from the group consisting of isopropenyl dimethyl benzyl isocyanate, methyl methacrylate, maleic anhydride, adducts of isophorone diisocyanate and 2-hydroxyethyl methacrylate and mixtures thereof; (iii) 0.1 to 3% by weight, based on 100% by weight of the sum of components (i), (ii) and (iii), of one or more isomers of diphenylmethane diisocyanate.

Certain embodiments of the present invention are directed to the polymer polyol compositions of either of the previous two paragraphs, wherein (A)(3)(a)(i) the starter contains from 1 to 40% by weight, based on 100% by weight of (A)(3)(a)(i), of ethylene oxide which is added either as a co-feed or as a cap.

Certain embodiments of the present invention are directed to the polymer polyol compositions of any of the previous three paragraphs, wherein (A)(3)(b) the one or more ethylenically unsaturated monomers comprises a mixture of styrene and acrylonitrile.

Certain embodiments of the present invention are directed to the polymer polyol compositions of any of the previous four paragraphs, wherein (A)(3)(b) the mixtures of styrene and acrylonitrile is present in a weight ratio of from 20:80 to 80:20.

Certain embodiments of the present invention are directed to the polymer polyol compositions of any of the previous five paragraphs, wherein (A)(3)(c) the free radical initiator is selected from the group consisting of azo compounds and peroxide compounds.

Certain embodiments of the present invention are directed to the polymer polyol compositions of any of the previous six paragraphs, wherein (A) the polymer polyol has a solids content of from 35 to 70% by weight.

Certain embodiments of the present invention are directed to the polymer polyol compositions of any of the previous seven paragraphs, wherein (A)(2) the ethylenically unsaturated monomers comprises styrene and acrylonitrile in a weight ratio of 80:20 to 20:80.

Certain embodiments of the present invention are directed to the Polymer polyol compositions of any of the previous eight paragraphs, wherein (A)(1) the base polyol has a functionality of from 3 to 6 and a hydroxyl number of from 25 to 200.

Certain embodiments of the present invention are directed to the polymer polyol compositions of any of the previous nine paragraphs, wherein (A)(4) the free radical initiator is selected from the group consisting of azo compounds, peroxide compounds and mixtures thereof.

Certain embodiments of the present invention are directed to the polymer polyol compositions of any of the previous ten paragraphs, wherein (B) the polyol has a functionality of from 2 to 6 and an OH number of from 25 to 200.

Certain embodiments of the present invention are directed to the polymer polyol compositions of any of the previous eleven paragraphs, wherein component (B) is present in an amount sufficient to reduce the total solids content in said polymer polyol (A) by at least 33% by weight.

Certain embodiments of the present invention are directed to the polymer polyol compositions of any of the previous twelve paragraphs, wherein component (B) is present in an amount sufficient to reduce the total solids content in said polymer polyol (A) by at least 61% by weight.

Certain embodiments of the present invention, therefore, are directed to a polymer polyol composition having a solids content of from 10 to 72% by weight, and comprising (A) a polymer polyol having a solids content of from 44 to 75% by weight, a viscosity at 25° C. of less than 50,000 mPa·s, and which comprises the reaction product of: (1) at least one base polyol having a functionality of from 2 to 8 and a hydroxyl number of from 20 to 400; (2) one or more ethylenically unsaturated monomers; (3) a preformed stabilizer which comprises the reaction product of: (a) a macromer that contains reactive unsaturation and comprises the reaction product of: (i) a starter compound having a functionality of 2 to 8 and a hydroxyl number of from 20 to 50; (ii) 0.1 to 3% by weight, based on 100% by weight of the sum of components (i), (ii) and (iii), of a hydroxyl-reactive compound that contains reactive unsaturation; and (iii) 0 to 3% by weight, based on 100% by weight of the sum of components (i), (ii) and (iii), of one or more diisocyanates; with (b) one or more ethylenically unsaturated monomers; and (c) at least one free radical initiator; in the presence of (d) a polymer control agent; and, optionally, (e) a liquid diluent; in the presence of (2) at least one free radical initiator; and, optionally, (3) a chain transfer agent; and (B) at least one polyol component having a functionality of from 1 to 8 and a hydroxyl number of from 20 to 400; wherein component (B) is present in an amount sufficient to reduce the total solids content in said polymer polyol (A) by at least 5% by weight.

Certain embodiments of the present invention are directed to the polymer polyol compositions of the previous paragraph, wherein (A)(3)(a) the macromer comprises the reaction product of (i) a starter compound having a functionality of 3 to 6 and a hydroxyl number of from 25 to 40; (ii) 0.1 to 3% by weight, based on 100% by weight of the sum of components (i), (ii) and (iii), of a hydroxyl-reactive compound that contains reactive unsaturation that is selected from the group consisting of isopropenyl dimethyl benzyl isocyanate, methyl methacrylate, maleic anhydride, adducts of isophorone diisocyanate and 2-hydroxyethyl methacrylate and mixtures thereof; (iii) 0.1 to 3% by weight, based on 100% by weight of the sum of components (i), (ii) and (iii), of one or more isomers of diphenylmethane diisocyanate.

Certain embodiments of the present invention are directed to the polymer polyol compositions of either of the previous two paragraphs, wherein (A)(3)(a)(i) the starter contains from 1 to 40% by weight, based on 100% by weight of (A)(3)(a)(i), of ethylene oxide which is added either as a co-feed or as a cap.

Certain embodiments of the present invention are directed to the polymer polyol compositions of any of the previous three paragraphs, wherein (A)(3)(b) the one or more ethylenically unsaturated monomers comprises a mixture of styrene and acrylonitrile.

Certain embodiments of the present invention are directed to the polymer polyol compositions of any of the previous four paragraphs, wherein (A)(3)(b) the mixtures of styrene and acrylonitrile is present in a weight ratio of from 20:80 to 80:20.

Certain embodiments of the present invention are directed to the polymer polyol compositions of any of the previous five paragraphs, wherein (A)(3)(c) the free radical initiator is selected from the group consisting of azo compounds and peroxide compounds.

Certain embodiments of the present invention are directed to the polymer polyol compositions of any of the previous six paragraphs, wherein (A) the polymer polyol has a solids content of from 35 to 70% by weight.

Certain embodiments of the present invention are directed to the polymer polyol compositions of any of the previous seven paragraphs, wherein (A)(2) the ethylenically unsaturated monomers comprises styrene and acrylonitrile in a weight ratio of 80:20 to 20:80.

Certain embodiments of the present invention are directed to the polymer polyol compositions of any of the previous eight paragraphs, wherein (A)(1) the base polyol has a functionality of from 3 to 6 and a hydroxyl number of from 25 to 200.

Certain embodiments of the present invention are directed to the polymer polyol compositions of any of the previous nine paragraphs, wherein (A)(4) the free radical initiator is selected from the group consisting of azo compounds, peroxide compounds and mixtures thereof.

Certain embodiments of the present invention are directed to the polymer polyol compositions of any of the previous ten paragraphs, wherein (B) the polyol has a functionality of from 2 to 6 and an OH number of from 25 to 200.

Certain embodiments of the present invention are directed to the polymer polyol compositions of any of the previous eleven paragraphs, wherein component (B) is present in an amount sufficient to reduce the total solids content in said polymer polyol (A) by at least 33% by weight.

Certain embodiments of the present invention are directed to the polymer polyol compositions of any of the previous twelve paragraphs, wherein component (B) is present in an amount sufficient to reduce the total solids content in said polymer polyol (A) by at least 61% by weight.

Certain embodiments of the present invention are directed to the polymer polyol compositions of any of the previous thirteen paragraphs, wherein component (A) has a solids content of from 45% to 75% by weight.

Certain embodiments of the present invention are directed to the process of preparing the novel polymer polyol compositions which have a solids content of from 10 to 72% by weight. This process comprises blending (A) a polymer polyol having a solids content of from 30 to 75% by weight, a viscosity at 25° C. of less than 50,000 mPa·s, and which comprises the free-radical polymerization product of: (1) at least one base polyol having a functionality of from 2 to 8 and a hydroxyl number of from 20 to 400; (2) one or more ethylenically unsaturated monomers; (3) a preformed stabilizer which comprises the reaction product of: (a) a macromer that contains reactive unsaturation and comprises the reaction product of: (i) a starter compound having a functionality of 2 to 8 and a hydroxyl number of from 20 to 50; (ii) 0.1 to 3% by weight, based on 100% by weight of the sum of components (i), (ii) and (iii), of a hydroxyl-reactive compound that contains reactive unsaturation; and (iii) 0 to 3% by weight, based on 100% by weight of the sum of components (i), (ii) and (iii), of one or more diisocyanates; with (b) one or more ethylenically unsaturated monomers; and (c) at least one free radical initiator; in the presence of (d) a polymer control agent; and, optionally, (e) a liquid diluent; in the presence of (2) at least one free radical initiator; and, optionally, (3) a chain transfer agent; with (B) at least one polyol component having a functionality of from 1 to 8 and a hydroxyl number of from 20 to 400; wherein component (B) is present in an amount sufficient to reduce the total solids content in said polymer polyol (A) by at least 5% by weight.

Certain embodiments of the present invention are directed to the process of the previous paragraph wherein (A) the polymer polyol has a solids content of from 44 to 75% by weight.

Certain embodiments of the present invention are directed to the processes of the previous two paragraphs, wherein (A)(3)(a) the macromer comprises the reaction product of (i) a starter compound having a functionality of 3 to 6 and a hydroxyl number of from 25 to 40; (ii) 0.1 to 3% by weight, based on 100% by weight of the sum of components (i), (ii) and (iii), of a hydroxyl-reactive compound that contains reactive unsaturation that is selected from the group consisting of isopropenyl dimethyl benzyl isocyanate, methyl methacrylate, maleic anhydride, adducts of isophorone diisocyanate and 2-hydroxyethyl methacrylate and mixtures thereof; (iii) 0.1 to 3% by weight, based on 100% by weight of the sum of components (i), (ii) and (iii), of one or more isomers of diphenylmethane diisocyanate.

Certain embodiments of the present invention are directed to the processes of the previous three paragraphs, wherein (A)(3)(a)(i) the starter contains from 1 to 40% by weight, based on 100% by weight of (A)(3)(a)(i), of ethylene oxide which is added either as a co-feed or as a cap.

Certain embodiments of the present invention are directed to the processes of the previous four paragraphs, wherein (A)(3)(b) the one or more ethylenically unsaturated monomers comprises a mixture of styrene and acrylonitrile.

Certain embodiments of the present invention are directed to the processes of the previous five paragraphs, wherein (A)(3)(b) the mixtures of styrene and acrylonitrile is present in a weight ratio of from 20:80 to 80:20.

Certain embodiments of the present invention are directed to the processes of the previous six paragraphs, wherein (A)(3)(c) the free radical initiator is selected from the group consisting of azo compounds and peroxide compounds.

Certain embodiments of the present invention are directed to the processes of the previous seven paragraphs, wherein (A)(3)(c) the free radical initiator is selected from the group consisting of azo compounds and peroxide compounds.

Certain embodiments of the present invention are directed to the processes of the previous eight paragraphs, wherein (A) the polymer polyol has a solids content of from 35 to 70% by weight.

Certain embodiments of the present invention are directed to the processes of the previous nine paragraphs, wherein (A)(2) the ethylenically unsaturated monomers comprises styrene and acrylonitrile in a weight ratio of 80:20 to 20:80.

Certain embodiments of the present invention are directed to the processes of the previous ten paragraphs, wherein (A)(1) the base polyol has a functionality of from 3 to 6 and a hydroxyl number of from 25 to 200.

Certain embodiments of the present invention are directed to the processes of the previous eleven paragraphs, wherein (A)(4) the free radical initiator is selected from the group consisting of azo compounds, peroxide compounds and mixtures thereof.

Certain embodiments of the present invention are directed to the processes of the previous twelve paragraphs, wherein (B) the polyol has a functionality of from 2 to 6 and an OH number of from 25 to 200.

Certain embodiments of the present invention are directed to the processes of the previous thirteen paragraphs, wherein component (B) is present in an amount sufficient to reduce the total solids content in said polymer polyol (A) by at least 33% by weight.

Certain embodiments of the present invention are directed to the processes of the previous fourteen paragraphs, wherein component (B) is present in an amount sufficient to reduce the total solids content in said polymer polyol (A) by at least 61% by weight.

Certain embodiments of the present invention are directed to flexible polyurethane foams, wherein the foam comprises the reaction product of: (I) at least one diisocyanate and/or polyisocyanate component, or a mixture thereof; with (II) an isocyanate-reactive component comprising any of the polymer polyol compositions described herein; in the presence of (III) one or more catalysts; (IV) one or more blowing agents; and, optionally, (V) one or more surfactants.

Certain embodiments of the present invention are directed to the flexible polyurethane foams of the previous paragraph, wherein (I) the at least one diisocyanate and/or polyisocyanate component comprises a mixture of one or more isomers of toluene diisocyanate, and a mixture of one or more isomers of diphenylmethane diisocyanate and/or polyphenylmethane polyphenylisocyanate.

Certain embodiments of the present invention are directed to any of the flexible polyurethane foams of the previous two paragraphs, wherein (II) the isocyanate-reactive component additionally comprises one or more of (1) at least one conventional polyol selected from the group consisting of polyether polyols, polyoxyalkylene polyols, polyester polyols, polycarbonate ether polyols, polycarbonate polyols, polyacetals and polythioethers; and (2) at least one of chain extenders and crosslinking agents.

Certain embodiments of the present invention are directed to any of the flexible polyurethane foams of the previous three paragraphs, wherein the chain extenders and/or crosslinking agents are selected from ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, glycerol, trimethylolpropane, pentaerythritol, diethanolamine, triethanolamine and mixtures thereof, and alkylene oxide adducts thereof.

Certain embodiments of the present invention are directed to any of the flexible polyurethane foams of the previous four paragraphs, wherein the blowing agent comprises water.

Certain embodiments of the present invention are directed to a process for the production of flexible polyurethane foams, by reacting: (I) one or more diisocyanates, polyisocyanates or mixtures thereof; with (II) an isocyanate-reactive component comprising any of the polymer polyol compositions described herein; in the presence of (III) one or more catalysts; (IV) one or more blowing agents; and, optionally, (V) one or more surfactants.

Certain embodiments of the present invention are directed to the process of the previous paragraph, wherein (I) the at least one diisocyanate and/or polyisocyanate component comprises a mixture of one or more isomers of toluene diisocyanate, and a mixture of one or more isomers of diphenylmethane diisocyanate and/or polyphenylmethane polyphenylisocyanate.

Certain embodiments of the present invention are directed to any of the processes of the previous two paragraphs, wherein (II) the isocyanate-reactive component additionally comprises one or more of (1) at least one conventional polyol selected from the group consisting of polyether polyols, polyoxyalkylene polyols, polyester polyols, polycarbonate ether polyols, polycarbonate polyols, polyacetals and polythioethers; and (2) at least one of chain extenders and crosslinking agents.

Certain embodiments of the present invention are directed to any of the processes of the previous three paragraphs, wherein the chain extenders and/or crosslinking agents are selected from ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, glycerol, trimethylolpropane, pentaerythritol, diethanolamine, triethanolamine and mixtures thereof, and alkylene oxide adducts thereof.

Certain embodiments of the present invention are directed to any of the processes of the previous four paragraphs, wherein the blowing agent comprises water.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples.

Polyol A: A propylene oxide adduct of sorbitol containing 16% ethylene oxide with a hydroxyl number of 28

Polyol B: A propylene oxide adduct of sorbitol containing 16% ethylene oxide with a hydroxyl number of 36

Polyol C: A propylene oxide adduct of glycerin containing 15% ethylene oxide with a hydroxyl number of 28

Polyol D: A propylene oxide adduct of glycerin containing 15% ethylene oxide with a hydroxyl number of 36

Base Polyol A: A propylene oxide adduct of glycerine containing a 20% ethylene oxide cap with a hydroxyl number of 36 and having a viscosity of 820 mPa·s Base Polyol B: a glycerin/sorbitol started polyether polyol containing about 81 to 82% of propylene oxide and about 17 to 18% of ethylene oxide, having a nominal functionality of about 3.5 and an OH number of about 31.5

CTA: Isopropanol, a chain transfer agent

TMI: Isopropenyl dimethyl benzyl isocyanate (an unsaturated aliphatic isocyanate) sold as TMI® by Allnex Isocyanate A: A monomeric MDI comprising about 42% by weight of the 4,4'-isomer of MDI, about 57% by weight of the 2,4'-isomer of MDI and the balance being the 2,2'-isomer of MDI Isocyanate B: toluene diisocyanate comprising 80% by weight of the 2,4-isomer and 20% by weight of the 2,6-isomer, and having an NCO group content of 48.3%

TBPEH: tert-Butylperoxy-2-ethylhexanoate

AIBN: 2,2'-Azobisisobutyronitrile, a free-radical polymerization initiator commercially available as VAZO 64 from E.I. Du Pont de Nemours and Co.

DEOA-LF: diethanolamine, a commercially available foam crosslinker/foam modifier that is commercially available from Air Products Catalyst A: 70% by weight bis[2-dimethylaminoethyl]ether in 30% dipropylene glycol, an amine catalyst, commercially available from Momentive Performance Materials as NIAX A-1

Catalyst B: 33% by weight diazabicyclooctane in 67% by weight dipropylene glycol, an amine catalyst, commercially available from Momentive Performance Materials as NIAX A-33

Surfactant A: a silicon surfactant commercially available as DC5043 from Air Products Viscosity: Dynamic viscosities reported in mPa·s at 25° C.

Filtration: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g. 1⅛ in. diameter), such that all of the polymer polyol and isopropanol solutions passes by gravity through a 150-mesh screen. The 150-mesh screen is made with a Dutch twill weave. The actual screen used had a nominal opening of 100 microns. The amount of sample which passes through the screen within 600 seconds is reported in percent, a value of 100 percent indicates that over 99 weight percent passes through the screen.

Macromer Preparation:

The Macromers in Table 1 were prepared by heating the relative amounts (see Table 1) of polyol, TMI, Isocyanate A, and 100 ppm of bismuth(III)neodecanoate catalyst at 75° C. for 4 hours. Wt. % is based on total macromer weight.

TABLE 1

Macromers A through R

| Macromer | Starter | Hydroxyl Number of Starter | Percent TMI (wt. %) | Percent Iso A (wt. %) | Viscosity, mPa.s (25° C.) |
|---|---|---|---|---|---|
| A | Polyol A | 28 | 0.45 | 0.4 | 3112 |
| B | Polyol A | 28 | 1 | 0.1 | 1975 |
| C | Polyol C | 28 | 0.5 | 0.2 | 1550 |
| D | Polyol A | 28 | 1.5 | 0.2 | 2318 |
| E | Polyol C | 28 | 0.5 | 0 | 1308 |
| F | Polyol C | 28 | 1.5 | 0.2 | 1699 |
| G | Polyol D | 36 | 1.5 | 0 | 982 |
| H | Polyol B | 36 | 1.5 | 0 | 1319 |
| I | Polyol A | 28 | 1 | 0.1 | 1978 |
| J | Polyol A | 28 | 1.5 | 0 | 1860 |
| K | Polyol D | 36 | 0.5 | 0.2 | 1009 |
| L | Polyol A | 28 | 0.5 | 0 | 1472 |
| M | Polyol C | 28 | 1.5 | 0 | 1410 |
| N | Polyol B | 36 | 0.6 | 0.2 | 1846 |
| O | Polyol B | 36 | 0.5 | 0 | 1206 |
| P | Polyol D | 36 | 1.5 | 0.2 | 1140 |
| Q | Polyol B | 36 | 0.5 | 0.2 | 1453 |
| R | Polyol A | 28 | 1 | 0.1 | 1984 |

Preformed Stabilizer (Pfs) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 2.

Preformed stabilizers A-R in Table 3 were prepared from Macromers A-R, respectively, using the following formulation:

TABLE 2

Preformed Stabilizer Composition

| Component | PFS |
|---|---|
| CTA type | isopropanol |
| CTA, wt. % | 60.0% |
| Macromer | Macromer A |
| Macromer, wt. % | 24.0% |
| Monomer, wt. % | 15.9% |
| Styrene/acrylonitrile ratio | 50:50 |
| TBPEH, wt. % | 0.1% |

TABLE 3

Preformed Stabilizers A-R

| Preformed Stabilizer | Macromer |
|---|---|
| A | A |
| B | B |
| C | C |
| D | D |
| E | E |
| F | F |
| G | G |
| H | H |
| I | I |
| J | J |
| K | K |
| L | L |
| M | M |
| N | N |
| O | O |
| P | P |
| Q | Q |
| R | R |

Polymer Polyol Preparation:

This series of examples (Table 4) relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping.

TABLE 4

Formulations for Polymer Polyols

|  | PMPO A | PMPO B | PMPO C |
|---|---|---|---|
| Base Polyol | A | A | A |
| Base Polyol (wt. % in feed) | 51.6 | 46.5 | 45.7 |
| PFS | A | A | N |
| PFS (wt. % in feed) | 7.8 | 8.3 | 8.3 |

TABLE 4-continued

Formulations for Polymer Polyols

|  | PMPO A | PMPO B | PMPO C |
|---|---|---|---|
| Styrene (wt. % in feed) | 25.6 | 28.4 | 28.0 |
| Acrylonitrile (wt. % in feed) | 14.8 | 16.4 | 16.2 |
| AIBN (wt. % in feed) | 0.29 | 0.32 | 0.32 |
| CTA (wt. % in feed) | 4.7 | 5.0 | 6.5 |
| Total Polymer (wt. %) | 43.0 | 47.9 | 48.0 |
| Viscosity mPa.s @ 25° C. | 5185 | 7375 | 6632 |
| Filterability-150 mesh (%) | 100 | 100 | 100 |
| Mean particle size (microns) | 1.05 | 1.39 | 1.42 |

General Procedure for Making Foams:

The following PMPO blends were used in the foam formulation in Table 5:

PMPO Blend A: PMPO A (40 wt. %) was added to Base Polyol B (60 wt. %) to give Blend A containing a total solids of 17.2% by weight.

PMPO Blend B: PMPO B (35.8 wt. %) was added to Base Polyol A (4.2 wt. %) and Base Polyol B (60 wt. %) to give Blend B containing a total solids of 17.2% by weight.

PMPO Blend C: PMPO B (35.8 wt. %) was added to Base Polyol B (64.2 wt. %) to give Blend C containing a total solids of 17.2% by weight.

PMPO Blend D: PMPO C (35.8 wt. %) was added to Base Polyol A (4.2 wt. %) and Base Polyol B (60 wt. %) to give Blend D containing a total solids of 17.2% by weight.

The foams in Table 5 were prepared by mixing, the surfactant, water, catalysts, and diethanolamine in a flask to create a master blend. Then, the desired amount of polymer polyol blend was added to a cup containing the desired amount of master blend. The contents of the cup were mixed for 55 seconds. The desired amount of Isocyanate component necessary to give an isocyanate index of 100 was added to the cup containing the master blend and polymer polyol mixture. The contents of the cup were mixed together for 5 seconds, and the reacting mixture was quickly poured into a 150° F. water-jacketed mold. After 4.5 minutes, the foam was removed from the mold, run through a cell-opening crushing device, and then placed in a 250° F. oven for 30 minutes to post cure. After 24 hours of aging in a controlled temperature and humidity laboratory, the foams were submitted for physical property testing.

TABLE 5

Foam Formulations and Physical Properties

|  | Foam 1 | Foam 2 | Foam 3 | Foam 4 |
|---|---|---|---|---|
| PMPO type | Blend A | Blend B | Blend C | Blend D |
| % Total S/AN solids | 17.2 | 17.2 | 17.2 | 17.2 |
| PMPO | 100 | 100 | 100 | 100 |
| WATER | 3 | 3 | 3 | 3 |
| DEOA-LF | 1.73 | 1.73 | 1.73 | 1.73 |
| Surfactant A | 0.5 | 0.5 | 0.5 | 0.5 |
| Catalyst B | 0.24 | 0.24 | 0.24 | 0.24 |
| Catalyst A | 0.1 | 0.1 | 0.1 | 0.1 |
| Isocyanate B | 39.57 | 39.56 | 39.56 | 39.56 |
| INDEX | 100 | 100 | 100 | 100 |
| Physical Properties |  |  |  |  |
| Density (lb/ft³) | 2.4 | 2.5 | 2.4 | 2.5 |
| IFD 25% | 42.0 | 48.0 | 48.7 | 49.9 |
| IFD 50% | 73.9 | 84.7 | 85.9 | 87.7 |
| IFD 65% | 113.0 | 129.8 | 131.5 | 133.5 |
| CFD 50% | 0.37 | 0.42 | 0.50 | 0.43 |
| Comp. Set. 50% | 9.06 | 8.82 | 10.2 | 9.19 |
| HA Ld Loss 50% | 0.33 | 0.36 | 0.35 | 0.36 |
| HACS 50% | 14.0 | 12.8 | 11.9 | 10.8 |
| Wet Set 50% | 27.2 | 20.8 | 19.1 | 20.7 |
| Solids Efficiency (50% IFD)* | 4.3 | 4.9 | 5.0 | 5.1 |

*Solids Efficiency = Measured IFD value (@ 50% IFD)/17.2% solids

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer polyol composition having a solids content of from 10 to 72% by weight, and comprising
   (A) a polymer polyol having a solids content of from 44 to 75% by weight, a viscosity at 25° C. of less than 50,000 mPa·s, and which comprises the reaction product of;
      (1) at least one base polyol having a functionality of from 2 to 8 and a hydroxyl number of from 20 to 400;
      (2) one or more ethylenically unsaturated monomers;
      (3) a preformed stabilizer which comprises the reaction product of:
         (a) a macromer that contains reactive unsaturation and comprises the reaction product of;
            (i) a starter compound having a functionality of 2 to 8 and a hydroxyl number of from 20 to 50;
            (ii) 0.1 to 3% by weight, based on 100% by weight, of the sum of components (i), (ii) and (iii), of a hydroxyl-reactive compound that contains reactive unsaturation;
            and
            (iii) 0.05 to 3% by weight, based on 100% by weight of the sum of components (i), (ii) and (ill), of diisocyanate;
         with
         (b) one or more ethylenically unsaturated monomer, and
         (c) at least one free radical intiator;
         in the presence of
         (d) a polymer control agent;
         and, optionally,
         (e) a liquid diluent;
      in the presence of
      (4) at least one free radical initiator;
      and, optionally,
      (5) a chain transfer agent:
   and
   (B) at, least one polyol component having a nationality of from 1 to 8 and a hydroxyl number of from 20 to 400; wherein component (B) is present in an amount sufficient to reduce the total solids content in said polymer polyol (A) by at least 5% by weight.

2. The polymer polyol composition of claim 1, wherein (A)(3)(a) said macromer comprises the reaction product of (i) a starter compound having a functionality of 3 to 6 and a hydroxyl number of from 25 to 40 (ii) 0.1 to 3% by weight, based on 100% by weight of the sum of components (i), (ii) and (iii): of a hydroxyl-reactive compound that contains reactive unsaturation that is selected from the group consisting of isopropenyl dimethyl benzyl isocyanate, methyl methacrylate, maleic anhydride, adducts of isophorone diisocyanate and 2-hydroxyethyl methacrylate and mixtures thereof; (iii) 0.1 to 3% by we based on 100% by weight of the sum of components (i), (ii) and (iii); of one or more isomers of diphenylmethane diisocyanate.

3. The polymer polyol composition of claim 1, wherein (A)(3)(a)(i) said starter contains from 1 to 40% by weight, based on 100% by weight of (A)(3)(a)(i), of ethylene oxide which is added either as a co-feed or as a cap.

4. The polymer polyol composition of claim 1, wherein (A)(3)(b) said one or more ethylenically unsaturated monomers comprises a mixture of styrene and acrylonitrile.

5. The polymer polyol composition of claim 1, wherein (A)(3)(b) said mixtures of styrene and acrylonitrile is present in a weight ratio of from 20:80 to 80:20.

6. The polymer polyol composition of claim 1, wherein (A)(3)(c) said free radical initiator is selected from the group consisting of azo compounds and peroxide compounds.

7. The polymer polyol composition of claim 1, wherein (A)(2) said ethylenically unsaturated monomers comprises styrene and acrylonitrile in a weight ratio of 80:20 to 20:80.

8. The polymer polyol composition of claim 1, wherein (A)(1) said base polyol has a functionality of from 3 to 6 and a hydroxyl number of from 25 to 200.

9. The polymer polyol composition of claim 1, wherein (A)(4) said free radical initiator is selected from the group consisting of azo compounds, peroxide compounds and mixtures thereof.

10. The polymer polyol composition of claim 1, wherein (B) said polyol has a functionality of from 2 to 3 and an OH number of from 25 to 200.

11. The polymer polyol composition of claim 1, wherein component (B) is present in an amount sufficient to reduce the total solids content in said polymer polyol (A) by at least 33% by weight.

12. The polymer polyol composition of claim 1, wherein component (B) is present in an amount sufficient to reduce the total solids content in said polymer polyol (A) by at least 61% by weight.

13. A polymer polyol composition having a solids content of from 10 to 72% by weight, and comprising
 (A) a polymer polyol having a solids content of from 44 to 75% by weight, a viscosity at 25° C. of less than 50,000 mPa·s, and which comprises the reaction product of
  (1) at least one base polyol having a functionality of from 2 to 8 and a hydroxyl number of from 20 to 400;
  (2) one or more ethylenically unsaturated monomers;
  (3) a preformed stabilizer which comprises the reaction product of:
   (a) a macromer that contains reactive unsaturation and comprises the reaction product of:
    (i) a starter compound having a functionality of 2 to 8 and a hydroxyl number of from 20 to 50;
    (ii) 0.1 to 3% by weight, based on 100% by weight of the sum of components (i), (ii) and (iii), of a hydroxyl-reactive compound that contains reactive unsaturation;
    and
    (iii) 0.05 to 3% by weight, based on 100% by weight of the sum of components (i), (ii) and (iii), of diisocyanate comprising one or more isomers of diphenylmethane diisocyanate or an isomeric mixture of diphenylmethane diisocyanate:
   with
   (b) one or more ethylenically unsaturated monomers; and
   (c) at least one free radical initiator;
   in the presence of
   (d) a polymer control agent;
   and, optionally,
   (e) a liquid diluent;
   in the presence of
  (4) at least one free radical initiator;
  and, optionally,
  (5) a chain transfer agent;
 and
 (B) at least one polyol component having a functionality of from 1 to 8 and a hydroxyl number of from 20 to 400;
wherein component (B) is present in an amount sufficient to reduce the total solids content in said polymer polyol (A) by at least 5% by weight.

14. A process for preparing a novel polymer polyol composition comprising:
 (I) blending:
  (A) a polymer polyol having a solids content of from 44 to 75% by weight, a viscosity at 25° C. of less than 50,000 mPa·s, and which comprises the reaction product of:
   (1) at least one base polyol having a functionality of from 2 to 8 and a hydroxyl number of from 20 to 400;
   (2) one or more ethylenically unsaturated monomers;
   (3) a preformed stabilizer which comprises the reaction product of:
    (a) a macromer that contains reactive unsaturation and comprises the reaction product of:
     (i) a starter compound having a functionality of 2 to 8 and a hydroxyl number of from 20 to 50;
     (ii) 0.1 to 3% by weight, based on 100% by weight of the sum of components (I), (ii) and (iii), of a hydroxyl-reactive compound that contains reactive unsaturation;
     and
     (iii) 0.05 to by weight, based on 100% by weight of the sum of components (i), (ii) and (iii), of diisocyanate;
    with
    (b) one or more ethylenically unsaturated monomers; and
    (c) at leas, one free radical initiator;
    in the presence of
    (d) a polymer control agent;
    and, optionally,
    (e) a liquid diluent;
    in the presence of
   (4) at least one free radical initiator;
   and, optionally,
   (5) a chain transfer agent;
  and
  (B) at least one polyol component having a functionality of from 1 to 8 and a hydroxyl number of from 20 to 400;
 wherein component (B) is present in an amount sufficient to reduce the total solids content in said polymer polyol (A) by at least 5% by weight.

15. A flexible polyurethane foam comprising the reaction product of;

(I) one or more diisocyanates, polyisocyanates or mixtures thereof;
with
(II) an isocyanate reactive component comprising the polymer polyol composition of claim 1;
in the presence of
(III) one or more catalysts;
(IV) one or more blowing agents;
and, optionally,
(V) one or more surfactants.

16. A process for the production of a flexible polyurethane foam comprising reacting:
(I) one or more diisocyanates, polyisocyanates or mixtures thereof;
with
(II) an isocyanate-reactive component comprising the polymer polyol composition of claim 1;
in the presence of
(III) one or more catalysts;
(IV) one or more blowing agents;
and, optionally,
one or more surfactants.

17. The flexible polyurethane foam of claim 15, which is characterized by an increased solids efficiency at X % IFD as measured in accordance with ASTM D3574, wherein X % IFD equals 25% IFD, 50% IFD or 65% IFD.

18. The process for the production of a flexible polyurethane form of claim 16, wherein the resultant flexible foam is characterized by an increased solids efficiency at X % IFD as measured in accordance with ASTM 03674, wherein X % IFD equals 25% IFD, 50% IFD or 65% IFD.

* * * * *